US006998997B2

(12) United States Patent
Stevenson et al.

(10) Patent No.: US 6,998,997 B2
(45) Date of Patent: Feb. 14, 2006

(54) SYSTEM AND METHOD FOR LEARNING MACRO ROUTINES IN A REMOTE CONTROL

(75) Inventors: George E. Stevenson, Seattle, WA (US); Leslie Alan Leech, Kowloon (HK); James R. W. Phillips, Bellevue, WA (US); David J. Rye, Kent, WA (US)

(73) Assignee: X10 Wireless Technology, Inc., Kent, WA (US)

( * ) Notice: Subject to any disclaimer, the term of this patent is extended or adjusted under 35 U.S.C. 154(b) by 800 days.

(21) Appl. No.: 10/161,108

(22) Filed: May 30, 2002

(65) Prior Publication Data

US 2004/0207535 A1   Oct. 21, 2004

(51) Int. Cl.
*G05B 19/22*  (2006.01)

(52) U.S. Cl. ............. 340/825.22; 341/176; 340/825.72

(58) Field of Classification Search ........... 340/825.22, 340/825.69, 825.72, 825.57; 341/176, 173; 348/734, 735, 725; 386/46; 398/111, 112
See application file for complete search history.

(56) References Cited

U.S. PATENT DOCUMENTS

| | | | | |
|---|---|---|---|---|
| 4,623,887 A | * | 11/1986 | Welles, II | 340/825.57 |
| 5,229,763 A | * | 7/1993 | Nakamaru | 340/825.72 |
| 5,414,426 A | * | 5/1995 | O'Donnell et al. | 341/176 |
| 5,526,035 A | | 6/1996 | Lappington et al. | |
| 5,774,664 A | | 6/1998 | Hidary et al. | |
| 5,827,180 A | | 10/1998 | Goodman | |
| 5,878,155 A | | 3/1999 | Heeter | |
| 5,902,234 A | | 5/1999 | Webb | |
| 5,929,850 A | | 7/1999 | Broadwin et al. | |
| 6,018,768 A | | 1/2000 | Ullman et al. | |
| 6,034,678 A | | 3/2000 | Hoarty et al. | |
| 6,037,932 A | | 3/2000 | Feinleib | |
| 6,049,333 A | | 4/2000 | LaJoie et al. | |
| 6,049,539 A | | 4/2000 | Lee et al. | |
| 6,052,556 A | | 4/2000 | Sampsell | |
| 6,750,802 B1 | * | 6/2004 | Olen | 341/176 |

OTHER PUBLICATIONS

Commissioner Tristani, Technical Requirements to Enable Blocking of Video Programming Based on Program Ratings, FCC-98-36, Mar. 12, 1998, pp. 1-22.

* cited by examiner

*Primary Examiner*—Michael Horabik
*Assistant Examiner*—William Bangachon
(74) *Attorney, Agent, or Firm*—Black Lowe and Graham PLLC

(57) ABSTRACT

A remote control for learning a macro routine of optical signals is provided. An optical receiver is arranged to receive optical signals from one or more original equipment remote controls. The optical receiver outputs electrical signals. A microprocessor receives the electrical signals from the optical receiver. A memory device stores the electrical signals from the optical receiver. An operator interface is electrically coupled to the microprocessor. The operator interface receives operator input to designate a macro routine of operator-selectable optical signals from the original equipment remote control. The microprocessor causes the electrical signals from the optical receiver that correspond to the operator-selectable optical signals from the original equipment remote control to be associated with the designated macro routine and stored in the memory device. Electrical signals associated with a macro designation are retrieved from the memory device and electrically coupled to an optical transmitter.

52 Claims, 5 Drawing Sheets

SYSTEM AND METHOD FOR LEARNING MACRO ROUTINES IN A REMOTE CONTROL

FIELD OF THE INVENTION

This invention relates generally to a remote control and, specifically, to a system and method for learning macro routines in a remote control.

BACKGROUND OF THE INVENTION

One of the pervasive features of consumer audio and video electronic components in recent years has been and continues to be the handheld remote control. The handheld remote control sends control signals to the controlled device by irradiating the device with infrared energy generated by infrared photo emitter diodes. The controlled device receives a pattern of intermittent irradiation or illumination comprising a control signal.

The remote control unit has stored patterns corresponding to push buttons assigned to various functions of the controlled device. Activating a button causes the excitation of the photo emitter diode according to the stored pattern, thereby generating and transmitting a control signal. Control signals tend to be short words of data representing a low order numeric signal corresponding to some function of the controlled electronic appliance. Conventionally, infrared (IR) remote control units use a carrier frequency of between 10 kHz and 75 kHz. The controlled device receives the signal with a photo detection diode and circuitry that interprets as logical lows and highs the alternating illumination of the photo emitter diode on the remote control unit. Such a signal corresponds to the pattern stored in the remote control unit.

Various manufacturers have selected unique numeric codes to control their devices. This unique coding has allowed differentiation between such devices. For instance, a Brand X VCR will have a limited vocabulary of signals that influence its action. The Brand Y television will have a different limited vocabulary of signals. If a signal is not present within a device's vocabulary, the device will do nothing. With several devices, each having a distinct and limited vocabulary, a single universal remote control can control all of them, distinctly.

Further, it is desirable for the universal remote control to learn macro routines of multiple keystrokes from various remotely controlled devices. For example, a universal remote control can store sequences of commands, such as VCR power followed by VCR play followed by TV power followed by TV audio/video. Such a macro routine would be associated with a macro designation, such as a number. Typically, remote controls with macro functionality include a single key, usually designated a macro key, for accessing macro routines. Thus, the user would only need to press a macro key followed by a desired macro routine number to access an entire sequence of stored keystrokes corresponding to several commands for various remotely controlled devices. This reduces the time required for issuing the several commands, and also reduces the probability of an undesired keystroke being pressed, resulting in an undesired command being issued.

Methods are currently known for programming macros in remote controls. For example, desired commands may be entered directly on a universal remote control as taught by U.S. Pat. No. 5,414,426. However, entering commands for remotely controlled devices directly on a universal remote control limits the number of commands for the remotely controlled devices to those command signals that are stored in memory on the universal remote control. Existing universal remotes that have macro capability can only store a sequence of commands if the individual commands are present in the code library in the universal remote.

It is also known to enter command codes for remotely controlled devices in a computer. Once all the commands are entered in the computer, the commands are transmitted from the computer to the universal remote control. A computer's knowledge of remotely controlled devices and their function commands is significantly greater than those that can be stored in a universal remote control on which the macro command sequences are entered directly as described above. Also, the computer's library of remotely controlled devices and their function commands can be easily updated, while those stored on a universal remote control cannot. However, entering the macro sequence on a computer and then transmitting it to the universal remote control requires access to a computer and associated software to learn and transmit the macro sequence.

Thus, there is an unmet need in the art for a universal remote control with a macro capability that is not limited to sequences of commands present in the universal remote control's code library and that does not receive sequences of commands that have been entered separately in a computer.

SUMMARY OF THE INVENTION

The present invention provides a system and method for learning and storing on a universal remote control a macro sequence of commands received optically from one or more original equipment remote controls. Advantageously, the present invention allows for programming macro sequences on a universal remote control by pressing the command buttons on the original equipment remote control and transmitting the commands from the original equipment remote control to the universal remote control for storage and subsequently retrieving and transmitting the macro commands to an original equipment remotely controlled device or devices. As a result, the present invention provides a remote control with a macro capability that is not limited to sequences of commands present in a code library and that does not receive sequences of commands that have been entered separately in a computer. The present invention thus represents a significant advantage over ways currently known in the art for learning macros, which are limited to the codes stored only in the universal remote that is learning the macros or that are stored in a computer from which the codes are being downloaded.

According to an embodiment of the present invention, a remote control learns and stores a macro routine received by optical communication with one or more original equipment remote controls. The remote control includes an optical receiver that is arranged to receive optical signals from an original equipment remote control and output electrical signals. A microprocessor is electrically coupled to receive the electrical signals from the optical receiver. The microprocessor includes a memory device that is arranged to store the electrical signals from the optical receiver. An operator interface is electrically coupled to the microprocessor, and is arranged to receive operator input to designate a macro routine of operator-selectable optical signals from the original equipment remote control. The microprocessor causes the electrical signals from the optical receiver that corresponds to the operator-selectable optical signals from the original equipment remote control to be associated with the macro designation and stored in the memory device.

According to a further aspect of the invention, the remote control further includes an optical transmitter that is arranged to transmit optical signals. The optical transmitter receives electrical signals from the microprocessor. The microprocessor causes the electrical signals associated with a macro designation to be retrieved from the memory device and electrically coupled to the optical transmitter.

According to another embodiment of the invention, a system is provided for learning and storing a macro routine of command signals for a remotely controlled device or devices. The system includes one or more original equipment remote controls that are arranged to transmit optical signals that are adapted for controlling functions of a remotely controlled device or devices. A universal remote control learns and stores a macro routine received by optical communication from the original equipment remote control. The universal remote control includes an optical receiver that is arranged to receive optical signals from an original equipment remote control and output electrical signals. A microprocessor is electrically coupled to receive the electrical signals from the optical receiver. The microprocessor includes a memory device that is arranged to store the electrical signals from the optical receiver. An operator interface is electrically coupled to the microprocessor, and is arranged to receive operator input to designate a macro routine of operator-selectable optical signals from the original equipment remote control. The microprocessor causes the electrical signals from the optical receiver that corresponds to the operator-selectable optical signals from the original equipment remote control to be associated with the macro designation and stored in the memory device. The remote control further includes an optical transmitter that is arranged to transmit optical signals. The optical transmitter receives electrical signals from the microprocessor. The microprocessor causes the electrical signals associated with a macro designation to be retrieved from the memory device and electrically coupled to the optical transmitter.

Another aspect of the present invention provides a method of recording a macro routine of original equipment remote control signals on a universal remote control. The method includes designating a macro routine on a universal remote control. A macro is defined by pressing desired function keys on the original equipment remote control. Optical communications are established between one or more original equipment remote controls and the universal remote control, and the macro is stored on the universal remote control.

According to a further aspect, the macro is retrieved on the universal remote control and is transmitted by the universal remote control to an original equipment remotely controlled device or devices.

According to a further aspect of the invention, a method is provided for editing a macro routine of original equipment remote control signals on a universal remote control. A macro routine to be edited is identified. Steps of the macro routine that are desired to be edited are selected. A desired time delay is inserted between the desired steps, and the edited macro routine with the desired time delays is stored. This delay allows time for an original equipment remotely controlled device to respond to an optical command from the universal remote control, before the next optical command is transmitted. For example, a command could be transmitted to turn a TV on, then a delay to allow the TV to "warm up" before a command is sent to change the TV's channel.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
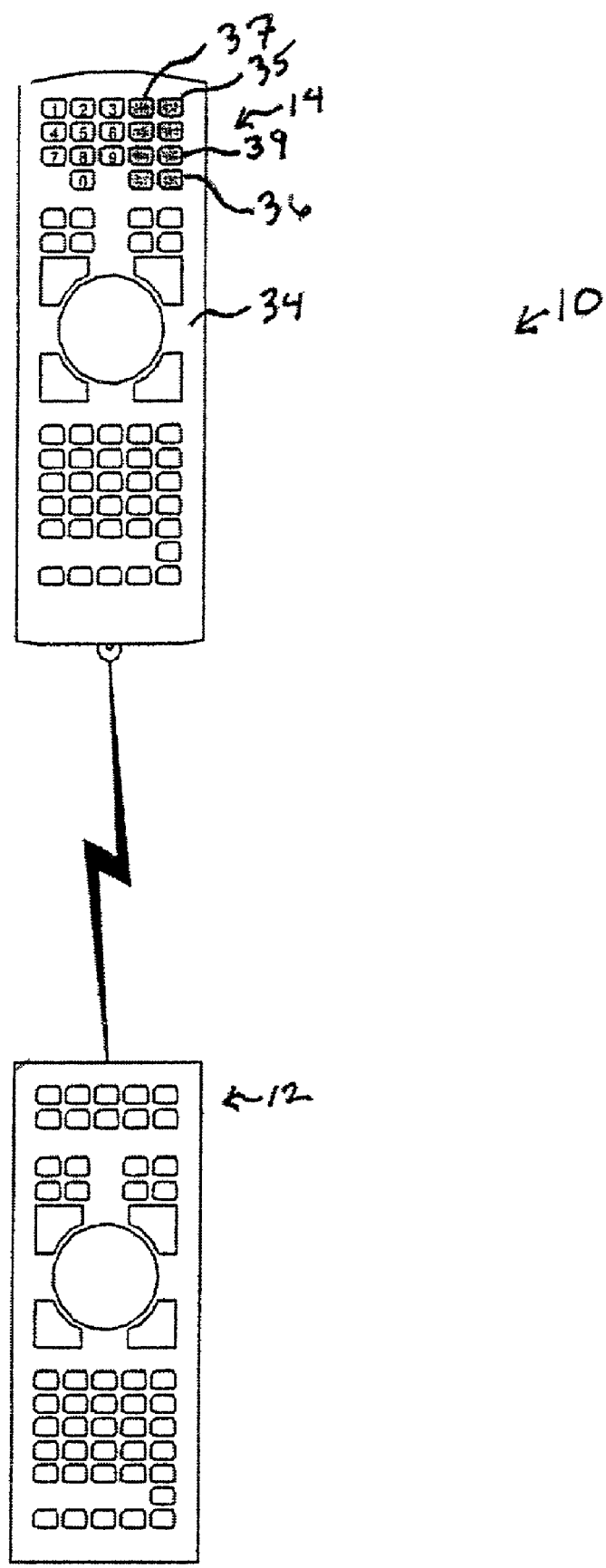
FIG. 1 is an embodiment of a system of two remote controls in optical communication.

FIG. 1 shows a system 10 for recording and storing a sequence of command signals, referred to as a macro, for controlling an original equipment remotely controlled device or devices. The original equipment remotely controlled device may include one or more of a variety of devices, such as a television (TV), a video cassette recorder (VCR), a digital video disk (DVD) player, an audio amplifier, a radio receiver, a compact disk (CD) player or recorder, or the like. By way of non-limiting example, a macro could include commands such as: turn on the TV, turn on the cable box and set it to channel 63, turn on the VCR, and set the VCR to record the program. The non-limiting example of this macro would involve learning commands from the original equipment remotes for a TV, cable box, and VCR. The system 10 includes one or more original equipment remote controls 12 that are associated with the original equipment remotely controlled device or devices as described above. The system 10 also includes a learning remote control 14, such as a universal remote control. The original equipment remote control 12 and the learning remote control 14 are in optical communication, as shown in FIG. 1. According to the present invention, a user designates a macro routine on the learning remote control 14. The user defines a macro by pressing desired keys on the original equipment remote control 12. The original equipment remote control 12 optically transmits command signals to the learning remote control 14, and the macro is stored on the learning remote control 14. When desired, the macro is retrieved on the learning remote control 14 and the command signals that make up the macro are transmitted to the original equipment remotely controlled device or devices. The present invention thus represents a significant advantage over ways currently known in the art for learning macros, which are limited to the codes stored only in the universal remote that is learning the macros or that are stored in a computer from which the codes are being downloaded.

Figure 2:
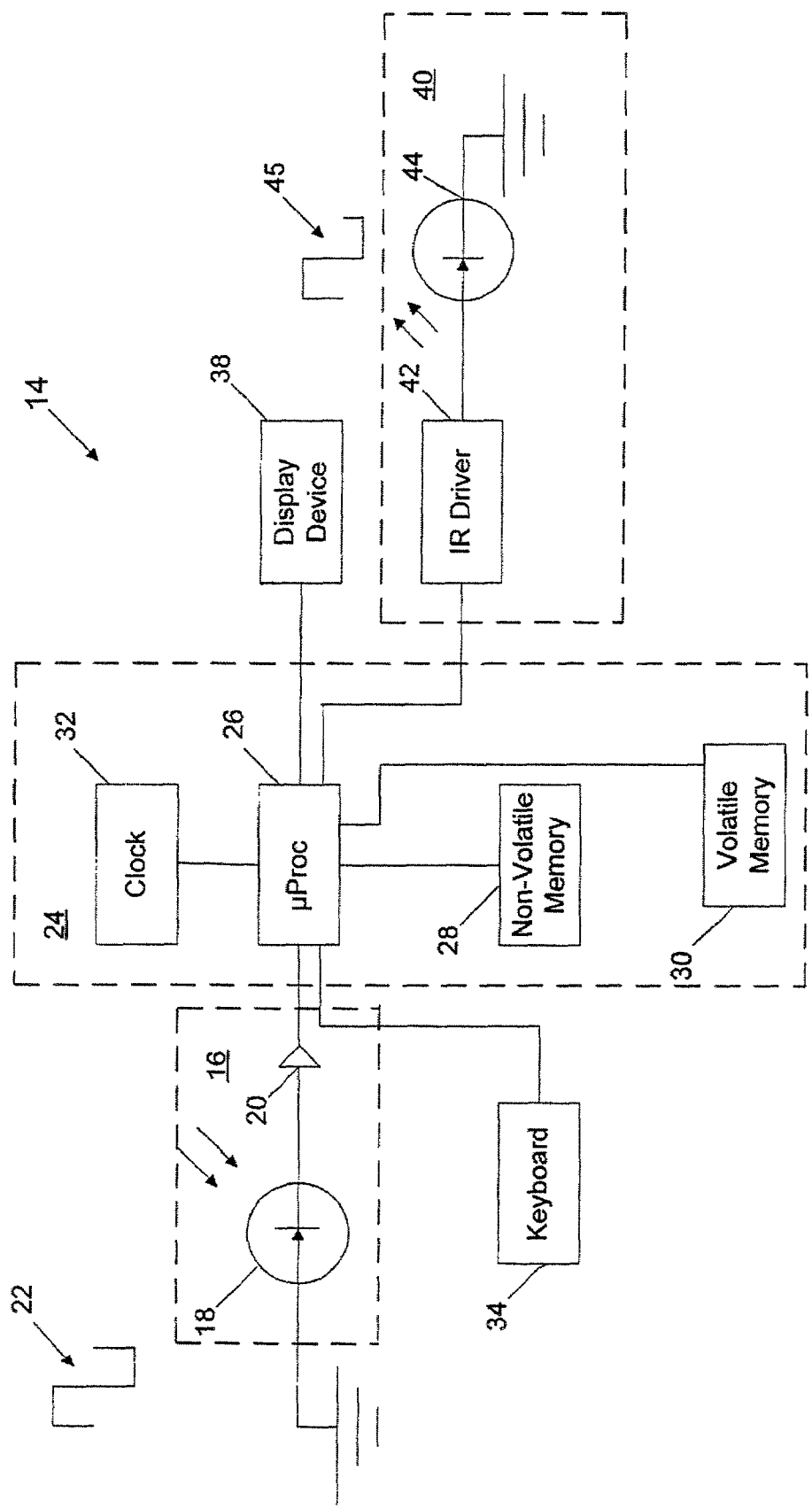
FIG. 2 is a block diagram of a remote control according to the present invention.

Referring now to FIG. 2, the learning remote control 14 includes an optical receiver section 16 that includes an infrared (IR) photo detector diode 18 and an amplifier 20. The photo detector diode 18 receives a serial bit control signal 22 from the handheld remote control unit, generally an infrared control signal with a carrier frequency of between 10 and 75 kHz. Of course, any frequency range may be used consistent with this invention. Commercially available IR remote control units use several modulation schemes to encode IR commands to the controlled device.

The photo detector diode 18 acts as its own demodulator in any IR communications application. Infrared radiation is that class of electromagnetic radiation with a frequency of between 1012 and 1014 Hz. The photo detector diode 18 will only trigger in the presence of infrared radiation and, when triggered, passes a constant current. Latency of the diode smoothes adjacent sampled highs into a single pulse. Thus, the signal from the photo detector diode 18 amplified by the amplifier 20 to logical levels requires no further demodulation.

The learning remote control 14 includes a processor section 24. The processor section 24 includes a microprocessor 26. The microprocessor 26 is coupled to receive an output signal from the amplifier 20. The microprocessor 26 may include any acceptable microprocessor that is known in the art. The processor section 24 also includes a nonvolatile memory device 28. The nonvolatile memory device 28 preferably stores operating system instructions for the microprocessor 26, and suitably includes known nonvolatile memory devices such as read-only memory (ROM), programmable read-only memory (PROM), electrically programmable read-only memory (EPROM), electrically erasable programmable read-only memory (EEPROM), or the like. The processor section 24 also includes a volatile memory device 30, such as random access memory (RAM), for temporarily storing signals that make up macro routines until the macro routines are saved in the nonvolatile memory 28. Macros are temporarily stored in the volatile memory 30 while the macro routines are being set up. When a routine setting up the macro is exited, the macro is saved in non-volatile memory 28. However, in another embodiment, macros are permanently saved in the volatile memory 30, thus eliminating the cost of the nonvolatile memory 28. In such an alternate embodiment, batteries (not shown) that provide electrical power to the remote control 14 also provide electrical power to the volatile memory 30. It is known in the art that a capacitor (not shown) can provide backup to the volatile memory 30 while the batteries that power the remote control 14 are being changed. As is known, the capacitor can provide up to around 30 seconds of backup to allow time to change the batteries, but it is understood that this time can be increased by increasing the value of the capacitor. The microprocessor 26 is gated by a clock 32. The microprocessor 26, the nonvolatile memory device 28, the volatile memory device 30, and the clock 32 are all suitable devices that are known in the art. It will be appreciated that a detailed description of the processor section 24 and its operation is not necessary for an understanding of the invention.

Figure 2A:
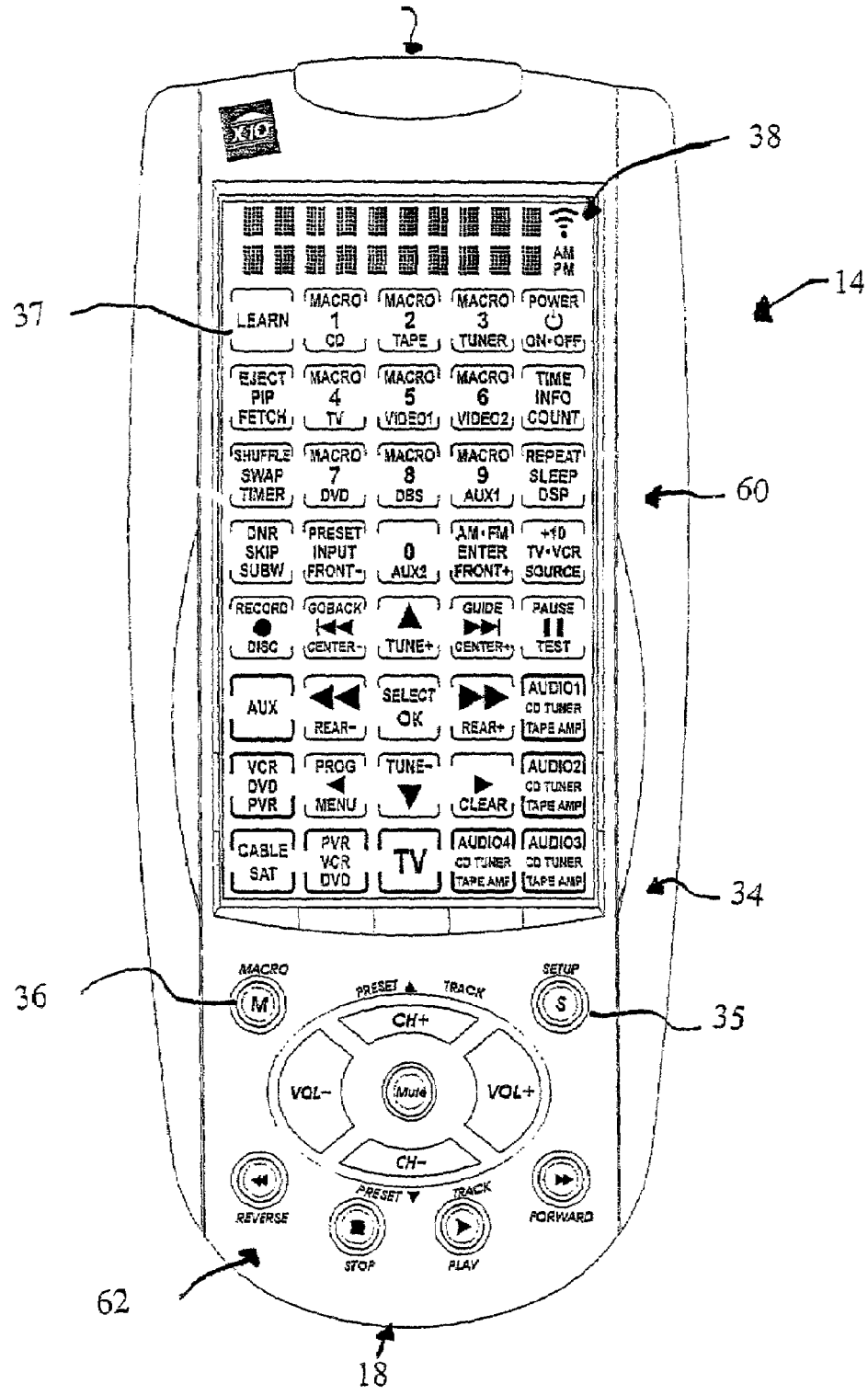
FIG. 2A is a plan view of virtual keyboard.

Referring to FIGS. 1 and 2, the learning remote control 14 includes a keyboard 34. As is known in the art, the keyboard 34 includes a plurality of keys that correspond to remote control functions, such as channel +, channel −, volume +, volume −, mute, play, stop, fast forward, rewind, and the like. As is also a known, the keyboard 34 includes a numeric keypad. The keyboard 34 includes a setup key 35. When the setup key 35 is depressed, the processor section 24 causes the learning remote control 14 to enter a mode that sets up selected functions. The keyboard 34 also includes a macro key 36. When the macro key 36 is depressed, the processor section 24 causes the learning remote control 14 to perform macro functions. For example, after the macro key 36 is depressed, the user depresses one or more of the numeric keys to designate or access a macro routine associated with that macro number designation. The keyboard 34 also includes a learn key 37. When the learn key 37 is depressed the processor section 24 causes the learning remote control 14 to enter a mode in which a macro routine is learned. The keyboard 37 also includes an exit key 39, When the exit key 39 is depressed, the processor section 24 causes the learning remote control 14 to exit its current operating mode. Additionally, the exit key 39 may be depressed in response to a prompt to indicate that the prompted selection is being declined. The keyboard 34 may be provided in various formats as desired. For example, in one embodiment the keyboard 34 is provided as a "virtual keyboard" 60 displayed on a Liquid Crystal Display (LCD) or "touchscreen." In another embodiment, the keyboard 34 includes a virtual keyboard 60 displayed on an LCD or touchscreen as well as some "hard keys" 62 as shown in FIG. 2A. In another embodiment, the keyboard 34 includes all hard keys as shown in FIG. 1.

The learning remote control 14 includes a display device 38. The display device 38 is suitably a known display device, such as a liquid crystal display (LCD) or a light emitting diode display (LED). The display device 38 receives its input signals from the microprocessor 26.

An optical transmitter section 40 receives electronic signals from the microprocessor 26, that have been retrieved from the volatile memory device 30, and converts the electronic signals from the microprocessor 26 to optical signals that are transmitted. The optical transmitter section includes an infrared driver 42. The infrared driver 42 outputs an electronic signal to an infrared diode 44. In response to receipt of an electronic signal from the infrared driver 42, the infrared diode 44 transmits an optical signal 45 that is similar in electromagnetic radiation characteristics to the serial bit control signal 22. In one embodiment, the infrared diode 44 is suitably provided as a separate diode from the photo detector diode 18. If desired, the photo detector diode 18 may be located at an opposite end of the learning remote control 14 from the location of the infrared diode 44. This arrangement provides for the photo detector diode 18 at an opposite end to a transmitting IR LED on the original equipment remotes 12. This permits the original equipment remotes 12 and the learning remote control 14 to point in a same direction. Thus, keys for the original equipment remote controls 12 and the learning remote control 14 are all "right side-up" to the user, instead of keys from one of the remote controls being "upside down" to the user. This makes learning macros easier, and is unique and different from other learning remotes known in the art.

Figure 3:
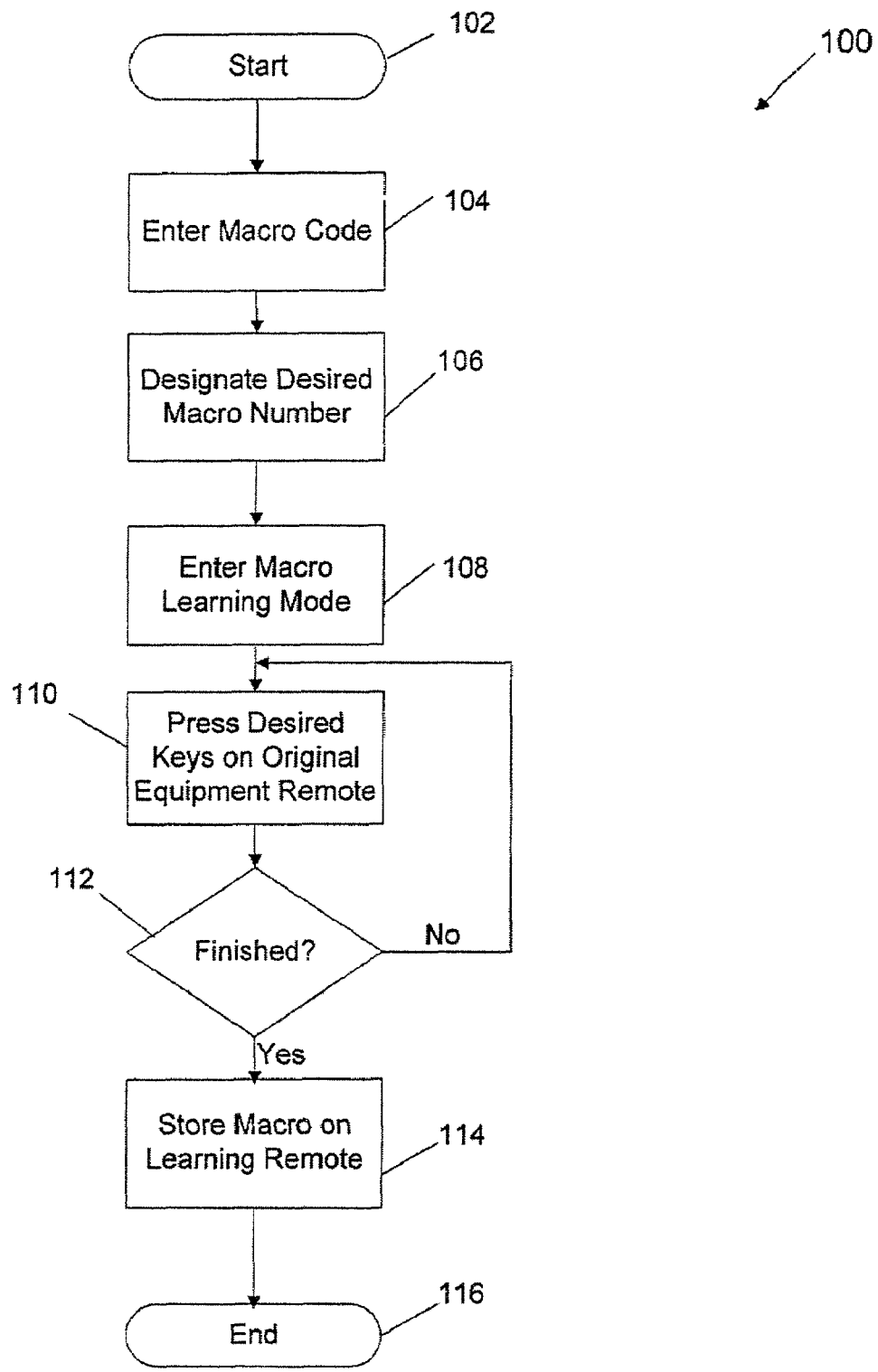
FIG. 3 is a flow chart showing a routine for learning a macro sequence according to the present invention.

Operation of the invention will now be explained with reference to FIGS. 1–3. FIG. 3 is a flow chart for a method 100 for learning a macro. The method starts at a block 102. At a block 104, a macro mode is entered. In one embodiment, the setup key 35 is depressed and the display device 38 displays a message that informs the user that a setup mode is entered. For example, a suitable message is "Code Setup . . . Mode?". However, text of any particular message may be chosen as desired in order to communicate to the user that the user is entering a setup mode. In one embodiment, the macro mode is entered directly by pressing the macro key 36. In another embodiment of the invention, the macro mode is entered by choosing the macro mode from a menu of modes as displayed on the display device 38. A selection of the macro mode from a menu of modes may be performed in any acceptable manner known in the art. A suitable method of selecting the macro mode from the menu of modes includes pressing up or down keys on the keyboard 34 until a message identifying the macro mode appears on the display device 38, and then confirming selection of the macro mode by depressing an enter key, an OK key, or the like.

At a block 106, a desired macro routine number is designated. According to one embodiment of the invention, one of the numeric keypads representing a number from 1–9 is pressed on the keyboard 34. The microprocessor 26 causes a word representing the macro routine number selected on the keyboard 34 to be stored in a buffer (not shown). As will be described later, the macro routine number and the macro routine are ultimately stored in the nonvolatile memory 28. As a result, the number of macro routines that can be learned and stored may be varied, as desired, depending upon memory space available to store the learned macro routines. For example, according to one embodiment of the invention, 9 macro routines may be learned and stored in the nonvolatile memory 28. If less memory space in the nonvolatile memory 28 is available, then fewer than 9 macro routines may be stored in the nonvolatile memory 28. Alternatively, it may be desirable to partition the nonvolatile memory 28 for other purposes, leaving available memory space in the nonvolatile memory 28 for fewer than 9 stored macro routines. Alternatively, a larger nonvolatile memory 28 may be used. In this case, more than 9 macro routines may be stored in the nonvolatile memory 28 and, at the block 106, a combination of two or more numeric keypads are pushed to designate the desired macro number.

At a block 108, a macro learning mode is entered. By entering the macro learning mode, the microprocessor 26 becomes prepared to receive command signals transmitted by the original equipment remote control 12 and received by the learning remote control 14 at the photo detector diode 18. In one embodiment of the invention, at the block 108 the display device 38 displays a message that prompts the user to confirm whether it is desired to learn the macro routine number that was designated at the block 106. Confirmation to enter the macro learning mode may be provided by depressing any acceptable key on the keyboard 34. For example, according to one embodiment of the invention, entering the macro learning mode is confirmed by pressing the learn key 37. Alternatively, it is not necessary to dedicate a specific key on the keyboard 34 as the learn key 37. According to another embodiment of the invention, any key on the keyboard 34 except the OK key may be pressed to enter the macro learning mode. When the learning mode is entered, the display device 38 displays a suitable message indicating that the learning remote control 14 is in the learning mode.

At a block 110, desired keys, representing desired functions to be performed by the original equipment remotely controlled device, are pressed on the original equipment remote control 12. According to an embodiment of the invention, the original equipment remote control 12 generates and transmits an optical signal, such as the serial bit control signal 22, that is received by the photo detector diode 18 of the learning remote control 14. At the block 110, infrared communications are established between the original equipment remote control 12 and the learning remote control 14. Infrared communications are suitably established by placing the original equipment remote control 12 and the learning remote control 14 end to end such that the photo detector diode 18 of the learning remote control 14 and the infrared diode 44 of the original equipment remote control 12 that is being learned from are within a line-of-sight at an acceptable distance, such as approximately two inches. When the microprocessor 26 receives the signal from the amplifier 20, the microprocessor causes the signal to be stored in the buffer (not shown). The microprocessor 26 also causes a counter to begin counting keystrokes. The microprocessor 26 causes the keystroke count to be placed in another buffer (not shown). According to one embodiment of the invention, when the signal is successfully received by the learning remote control 14 and stored in the buffer (not shown), the microprocessor 26 causes the display device 38 to display a message informing the user that the signal has been successfully stored. The displayed message regarding successful storage of the signal prompts the user to release the key on the original equipment remote control 12. The microprocessor 26 causes the counter to increment the count of the signal to be stored by one, and the learning remote control 14 is ready to receive the next optical signal from the original equipment remote control 12.

At a decision block 112, a determination is made whether all of the desired commands have been transmitted from the original equipment remote control 12 to the learning remote control 14. It will be appreciated that the number of command signals that may be stored for each macro routine may be limited due to memory constraints. For example, it may be desirable to limit the number of command signals per macro routine to a predetermined number, such as 20. It will be appreciated, however, that any limit to the number of signals per macro routine may be selected as desired. When a determination is made at the decision block 112 that more commands are to be learned for the macro routine, the method returns to the block 110, and more commands are transmitted from the original equipment remote control 12 to the learning remote control 14.

When a determination is made at the decision block 112 that no more commands are to be transmitted from the original equipment remote control 12 to the learning remote control 14, the method proceeds to block 114 where the macro routine is stored on the learning remote control 14. The determination that no more commands are to be transmitted from the original equipment remote control 12 may be made by the user. Alternatively, according to one embodiment of the invention, the determination may be made at the decision block 112 that no more commands are to be transmitted by the original equipment remote control 12 when the counter indicates that the predetermined number of commands have been transmitted by the original equipment remote control 12. At the block 114, the microprocessor 26 causes the display device 38 to display a suitable message that prompts the user to store the desired macro routine. The user pushes a suitable key, such as an OK key or an Enter key on the keyboard 34. The microprocessor 26 then causes the number designation of the macro routine and the signals for the commands of the designated macro routine to be loaded from the buffer (not shown) into the volatile memory device 30 for storage. Alternatively, when the predetermined number of signals have been received from the original equipment remote control 12, the microprocessor 26 automatically causes the macro routine designation number and command signals to be loaded from the buffer (not shown) into the volatile memory 30 for storage. The method ends at a block 116.

Figure 4:
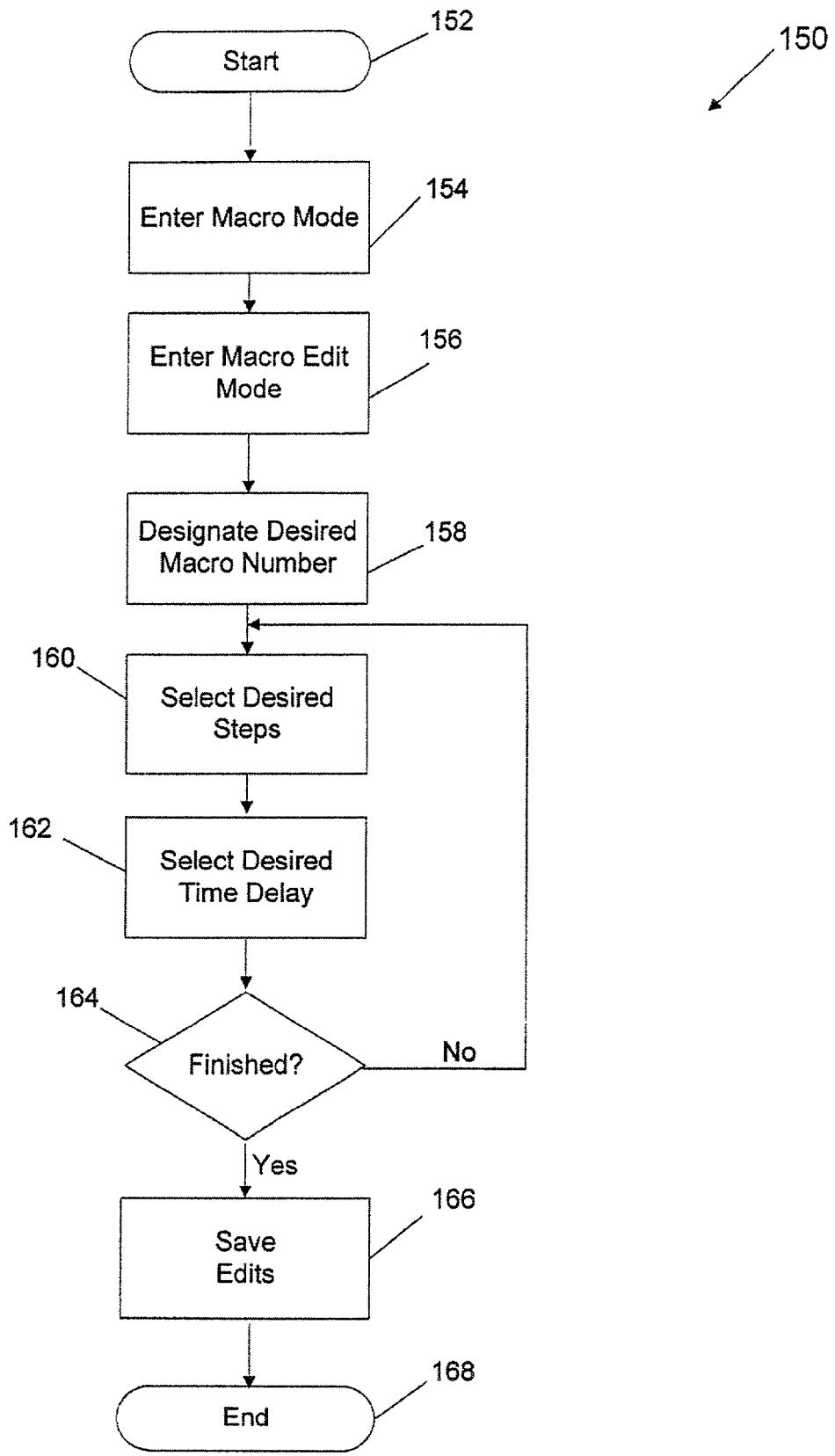
FIG. 4 is a flow chart showing a routine for editing a macro sequence according to the present invention.

Referring now to FIGS. 1, 2 and 4, a method 150 is provided for editing a macro routine. The method 150 permits delays to be varied between optical transmissions of commands within a macro routine. It will be appreciated that response time of different remotely controlled devices varies depending upon device and depending upon the function the device is performing. For example, it may take several seconds for a picture tube of a television to warm up in response to a command that turns on the television. However, response time by a remotely controlled device may be approximately instantaneous to other commands, such as commands to adjust volume or channel selection.

The method 150 begins at a block 152. At a block 154, the macro mode is entered as described above for the block 106. At a block 156, a macro edit mode is entered similarly to entering the macro learning mode at the block 110. At a block 158, the desired macro number is designated similarly to designating the desired macro number at the block 108.

At a block 160, desired steps are selected between which a delay is to be edited. The microprocessor 26 causes the display device 38 to display a current and a next step in the macro routine, and the current delay between transmission of optical signals corresponding to the current and the next steps. For example, initially the display device 38 indicates steps 1 and 2 and the delay between steps 1 and 2, such as for example, one second. It will be appreciated that any acceptable time delay may be initially inserted between steps of a macro routine. Selection of any initial or default delay between consecutive steps of a macro routine may be made as desired.

At a block 162, a desired time delay is selected. In one embodiment of the invention, a predetermined key on the keyboard, such as the up key, can be pressed to increase delay time. Conversely, delay time may be decreased by pressing a different predetermined key on the keyboard, such as the down key. In response to the up or down keys being depressed, the microprocessor 26 designates an appropriate number of blocks of memory locations in the volatile memory device 30 that are inserted between the selected steps of the macro routine. As the macro routine is accessed for transmission to the remotely controlled device, the commands are caused to page through the blocks of memory location in a known manner, thus inserting time delays between the commands. In an embodiment of the invention, each press of the up key or down key increases or decreases, respectively, by 0.5 seconds the delay between steps of a macro routine. It will be appreciated, however, that length of each incremental edit to delay time between steps in a macro routine in response to pressing of the predetermined key may be selected as desired.

It may further be desirable to limit minimum and maximum delay times between consecutive steps of a macro routine. For example, in an embodiment of the invention, minimum delay time between consecutive steps of a macro routine is 0.5 seconds. Similarly, in an embodiment of the invention, maximum delay time between consecutive steps of a macro routine is 9.5 seconds. It will be appreciated, though, that selection of any particular minimum or maximum delay time, if any, is determined as desired to conserve memory space.

At a decision block 164, a determination is made whether or not editing delay times is finished. If a determination is made that editing delay times is not finished, the method returns to the block 160. In an embodiment of the invention, the OK key is pressed to return to the block 160. In response to pressing of the OK key, the microprocessor 26 causes the counter (not shown) to increment by one the current and next macro routine steps between which the delay time is to be edited. When a determination is made at the decision block 164 that editing delay time is finished, the method proceeds to a block 166. In an embodiment of the invention, the user may finish editing macro step delay times whenever desired simply by pressing a predetermined key, such as the exit key 39. Alternatively, after the delay time between the next-to-last and last steps of a macro routine is edited, the method 150 proceeds to the block 166.

At the block 166, edits to delay times are saved. The microprocessor 26 causes the macro routine with edited delay times to be stored in the nonvolatile memory device 28 as described above. The method 150 ends at a block 168.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A remote control comprising:
   an optical receiver arranged to receive optical signals from an original equipment remote control, the optical receiver outputting electrical signals;
   a microprocessor electrically coupled to receive the electrical signals from the optical receiver;
   a memory device that is arranged to store the electrical signals from the optical receiver; and
   an operator interface electrically coupled to the microprocessor, the operator interface being arranged to receive operator input to designate a macro routine of operator-selectable optical signals from the original equipment remote control, the microprocessor causing the electrical signals from the optical receiver that correspond to the operator-selectable optical signals from the original equipment remote control to be associated with the designated macro routine and stored in the memory device.

2. The remote control of claim 1, further comprising:
   an optical transmitter arranged to transmit optical signals, the optical transmitter electrically coupled to receive electrical signals from the micro processor; and
   wherein the microprocessor causes the electrical signals associated with a macro designation to be retrieved from the memory device and electrically communicated to the optical transmitter.

3. The remote control of claim 1, wherein the optical receiver includes:
   a first optical element arranged to receive infrared optical signals and output electrical signals; and
   an amplifier electrically coupled to receive the electrical signals from the first optical element.

4. The remote control of claim 3, wherein the first optical element includes a first photo diode.

5. The remote control of claim 2, wherein the optical transmitter includes:
   an infrared driver arranged to receive electrical signals from the micro processor; and
   a second optical element electrically coupled to the infrared driver and arranged to output infrared optical signals.

6. The remote control of claim 5, wherein the second optical element includes a second photo diode.

7. The remote control of claim 6, wherein the remote control further comprises a housing, the first and second photo diodes being spaced apart at opposite ends of the housing.

8. The remote control of claim 1, wherein the operator interface includes a keyboard.

9. The remote control of claim 8, wherein the keyboard includes a macro key.

10. The remote control of claim 8, wherein the keyboard includes a virtual keyboard displayed on a touchscreen.

11. The remote control of claim 8, wherein the keyboard includes hard keys.

12. A remote control comprising:
   a first photo diode arranged to receive optical signals from an original equipment remote control and generate electrical signals that correspond to the optical signals received from the original equipment remote control;

an amplifier electronically coupled to receive the electrical signals from the first photo diode;

a microprocessor electronically coupled to receive output signals from the amplifier;

a memory device that is arranged to store output signals from the amplifier; and a keyboard that is electronically coupled to the microprocessor, the keyboard including a macro key, the keyboard being arranged to receive operator input to designate a macro routine of operator-selectable optical signals from the original equipment remote control, the microprocessor causing the output signals from the amplifier that correspond to the operator-selectable optical signals from the original equipment remote control to be associated with the designated macro routine and stored in the memory device.

13. The remote control of claim 12, further comprising:

an infrared driver arranged to receive electrical signals from the microprocessor;

a second photo diode arranged to receive electrical signals from the IR driver and arranged to output infrared optical signals; and wherein the microprocessor causes electrical signals associated with a macro designation to be retrieved from the memory device and electrically communicated to the infrared driver.

14. A remote control comprising:

means for receiving optical signals from an original equipment remote control, the receiving means outputting electrical signals that correspond to the optical signals from the original equipment remote control;

means for processing the electrical signals from the receiving means;

means for storing the electrical signals from the receiving means; and means for interfacing with an operator, the interface means being arranged to receive operator input to designate a macro routine of operator-selectable optical signals from the original equipment remote control, the processing means causing the electrical signals from the receiver means that correspond to the operator-selectable optical signals from the original equipment remote control to be associated with the macro designation and stored in the storing means.

15. The remote control of claim 14, further comprising:

means for transmitting optical signals, the transmitting means receiving electrical signals from the processing means; and wherein the processing means causes the electrical signals associated with a macro designation to be retrieved from the storing means and electrically coupled to the transmitting means.

16. The remote control of claim 14, wherein the receiving means includes a photo diode.

17. The remote control of claim 14, wherein the processing means includes a microprocessor.

18. The remote control of claim 14, wherein the storing means includes a memory device.

19. The remote control of claim 14, wherein the interface means includes a keyboard.

20. The remote control of claim 19, wherein the keyboard includes a virtual keyboard displayed on a touchscreen.

21. The remote control of claim 19, wherein the keyboard includes hard keys.

22. The remote control of claim 15, wherein the transmitting means includes a photo diode.

23. A system for recording a macro routine of optical signals, the system comprising:

at least one original equipment remote control arranged to transmit optical signals that are adapted for controlling functions of remotely controlled devices; and a learning remote control including:

an optical receiver arranged to receive optical signals from an original equipment remote control, the optical receiver outputting electrical signals;

a microprocessor electrically coupled to receive the electrical signals from the optical receiver;

a memory device that is arranged to store the electrical signals from the optical receiver; and an operator interface electrically coupled to the microprocessor, the operator interface being arranged to receive operator input to designate a macro routine of operator-selectable optical signals from the original equipment remote control, the microprocessor causing the electrical signals from the optical receiver that correspond to the operator-selectable optical signals from the original equipment remote control to be associated with the designated macro routine and stored in the memory device.

24. The system of claim 23, wherein the learning remote control further includes:

an optical transmitter arranged to transmit optical signals, the optical transmitter electrically coupled to receive electrical signals from the micro processor; and wherein the microprocessor causes the electrical signals associated with a macro designation to be retrieved from the memory device and electrically communicated to the optical transmitter.

25. The system of claim 23, wherein the optical receiver includes:

a first optical element arranged to receive infrared optical signals and output electrical signals; and an amplifier electrically coupled to receive the electrical signals from the first optical element.

26. The system of claim 25, wherein the first optical element includes a first photo diode.

27. The system of claim 24, wherein the optical transmitter includes:

an infrared driver arranged to receive electrical signals from the microprocessor; and a second optical element electrically coupled to the infrared driver and arranged to output infrared optical signals.

28. The system of claim 27, wherein the second optical element includes a second photo diode.

29. The system of claim 28, wherein the learning remote control further comprises a housing, the first and second photo diodes being spaced apart at opposite ends of the housing.

30. The system of claim 23, wherein the operator interface includes a keyboard.

31. The system of claim 30, wherein the keyboard includes a macro key.

32. The system of claim 30, wherein the keyboard includes a virtual keyboard displayed on a touchscreen.

33. The system of claim 30, wherein the keyboard includes hard keys.

34. A system for recording a macro routine of optical signals, the system comprising:

at least one original equipment remote control arranged to transmit optical signals that are adapted for controlling functions of remotely controlled devices; and a learning remote control, including:

a first photo diode arranged to receive optical signals from an original equipment remote control and generate electrical signals that correspond to the optical signals received from the original equipment remote control;

an amplifier electronically coupled to receive the electrical signals from the first photo diode;

a microprocessor electronically coupled to receive output signals from the amplifier;

a memory device that is arranged to store output signals from the amplifier; and a keyboard that is electronically coupled to the microprocessor, the keyboard including a macro key, the keyboard being arranged to receive operator input to designate a macro routine of operator-selectable optical signals from the original equipment remote control, the microprocessor causing the output signals from the amplifier that correspond to the operator-selectable optical signals from the original equipment remote control to be associated with the designated macro routine and stored in the memory device.

35. The system of claim 34, wherein the learning remote control further includes:

an infrared driver arranged to receive electrical signals from the microprocessor;

a second photo diode arranged to receive electrical signals from the IR driver and arranged to output infrared optical signals; and wherein the microprocessor causes electrical signals associated with a macro designation to be retrieved from the memory device and electrically communicated to the infrared driver.

36. The system of claim 34, wherein the optical receiver includes:

a first optical element arranged to receive infrared optical signals and output electrical signals; and an amplifier electrically coupled to receive the electrical signals from the first optical element.

37. The system of claim 36, wherein the first optical element includes a first photo diode.

38. The system of claim 35, wherein the optical transmitter includes:

an infrared driver arranged to receive electrical signals from the microprocessor; and a second optical element electrically coupled to the infrared driver and arranged to output infrared optical signals.

39. The system of claim 38, wherein the second optical element includes a second photo diode.

40. The system of claim 39, wherein the learning remote control further comprises a housing, the first and second photo diodes being spaced apart at opposite ends of the housing.

41. The system of claim 34, wherein the keyboard includes a virtual keyboard displayed on a touchscreen.

42. The system of claim 34, wherein the keyboard includes hard keys.

43. The system of claim 34, wherein the keyboard includes a macro key.

44. A system for recording a macro routine of optical signals, the system comprising:

means for generating and transmitting original equipment remote control optical signals; and means for generating and transmitting universal remote control optical signals, including:

means for receiving optical signals from the original equipment remote control optical signal generating means, the receiving means outputting electrical signals that correspond to the optical signals from the original equipment remote control;

means for processing the electrical signals from the receiving means;

means for storing the electrical signals from the receiving means; and means for interfacing with an operator, the interface means being arranged to receive operator input to designate a macro routine of operator-selectable optical signals from the original equipment remote control optical signal generating means, the processing means causing the electrical signals from the receiver means that correspond to the operator-selectable optical signals from the original equipment remote control to be associated with the macro designation and stored in the storing means.

45. The system of claim 44, wherein the universal remote control optical signal generating and transmitting means further includes:

means for transmitting optical signals, the transmitting means receiving electrical signals from the processing means; and wherein the processing means causes the electrical signals associated with a macro designation to be retrieved from the storing means and electrically coupled to the transmitting means.

46. The system of claim 44, wherein the receiving means includes a photo diode.

47. The system of claim 44, wherein the processing means includes a microprocessor.

48. The system of claim 44, wherein the storing means includes a memory device.

49. The system of claim 44, wherein the interface means includes a keyboard.

50. The system of claim 49, wherein the keyboard includes a virtual keyboard displayed on a touchscreen.

51. The system of claim 49, wherein the keyboard includes hard keys.

52. The system of claim 44, wherein the transmitting means includes a photo diode.

* * * * *